US012069434B2

(12) United States Patent
Özden et al.

(10) Patent No.: US 12,069,434 B2
(45) Date of Patent: Aug. 20, 2024

(54) HEARING DEVICE WITH ACTIVE ANTENNA SWITCHING

(71) Applicant: GN Hearing A/S, Ballerup (DK)

(72) Inventors: Sinasi Özden, Ballerup (DK); Jesper Thaysen, Skovlunde (DK); Søren Helstrup Kvist, Vaerlose (DK); Jens Henrik Steffens, Ballerup (DK)

(73) Assignee: GN HEARING A/S, Ballerup (DK)

( * ) Notice: Subject to any disclaimer, the term of this patent is extended or adjusted under 35 U.S.C. 154(b) by 177 days.

(21) Appl. No.: 17/694,646

(22) Filed: Mar. 14, 2022

(65) Prior Publication Data

US 2022/0279291 A1 Sep. 1, 2022

Related U.S. Application Data

(63) Continuation of application No. PCT/EP2020/079482, filed on Oct. 20, 2020.

(30) Foreign Application Priority Data

Oct. 25, 2019 (EP) .................................... 19205404

(51) Int. Cl.
*H04R 25/00* (2006.01)

(52) U.S. Cl.
CPC ......... *H04R 25/505* (2013.01); *H04R 25/552* (2013.01); *H04R 25/554* (2013.01); *H04R 2225/51* (2013.01)

(58) Field of Classification Search
CPC .. H04R 25/505; H04R 25/552; H04R 25/554; H04R 2225/51; H04R 2225/31; H04R 2225/61
See application file for complete search history.

(56) References Cited

FOREIGN PATENT DOCUMENTS

| | | |
|---|---|---|
| CN | 107810644 | 3/2018 |
| CN | 110012404 | 7/2019 |
| EP | 2871861 | 5/2015 |
| EP | 3313096 | 4/2018 |

(Continued)

OTHER PUBLICATIONS

Foreign Exam Report for EP Patent Appln. No. 19205404.7 dated Jan. 17, 2023.

(Continued)

*Primary Examiner* — Brian Ensey
(74) *Attorney, Agent, or Firm* — Vista IP Law Group, LLP

(57) ABSTRACT

A hearing device includes a signal processor, the signal processor being configured for determining a hearing device mode of operation, the hearing device mode comprising a first mode and a second mode. The hearing device further comprises a first wireless communication unit and a second wireless communication unit, and an electrical antenna for emission and reception of electromagnetic radiation. The antenna is configured to resonate at a first frequency. The hearing device further comprises an active matching device configured to interconnect the first and the second wireless communication unit with the antenna, wherein the active matching device in the first mode is configured to enable the antenna to emit and receive electromagnetic radiation at the first frequency and wherein the active matching device in the second mode is configured to adjust antenna characteristics of the antenna to enable the antenna to emit and receive electromagnetic radiation at the second frequency.

17 Claims, 8 Drawing Sheets

(56) References Cited

FOREIGN PATENT DOCUMENTS

| | | |
|---|---|---|
| EP | 3493556 | 6/2019 |
| WO | WO 2012092973 | 7/2012 |

OTHER PUBLICATIONS

PCT International Preliminary Report on Patentability for International Appln. No. PCT/EP2020/079482 dated Apr. 26, 2022.
Extended European Search Report for EP Patent Appln. No. 19205404.7 dated Apr. 2, 2020.
PCT International Search Report and Written Opinion for International Appln. No. PCT/EP2020/079482 dated Dec. 22, 2020.
Foreign OA for Chinese patent application No. 202080074057 dated Apr. 26, 2024.
Summons to Oral Proceedings for European Patent Application No. 19205404.7 dated Jun. 21, 2024.
Galster, J., "A New Method For Wireless Connectivity In Hearing Aids," The Hearing Journal 63(10):p. 36,38-39, Oct. 2010.

HEARING DEVICE WITH ACTIVE ANTENNA SWITCHING

RELATED APPLICATION DATA

This application is a continuation of International Patent Application No. PCT/EP2020/079482 filed on Oct. 20, 2020, which claims priority to and the benefit of European Patent Application No. 19205404.7 filed on Oct. 25, 2019. The entire disclosures of the above applications are expressly incorporated by reference herein.

FIELD

The present disclosure relates to hearing devices and methods therefore, particularly hearing devices having wireless communication capabilities and thus hearing devices comprising antennas for communication.

The present disclosure further relates to a hearing device configured to communicate using magnetic induction and/or to communicate through the use of radio frequencies. The hearing device may be used in a binaural hearing device system. The hearing device may be hearing devices for compensating a hearing loss of a user. During operation, the hearing device is worn in or at the ear of a user, such as for alleviating a hearing loss of the user.

BACKGROUND

Hearing devices, such as hearing aids, may comprise an antenna and a wireless communication unit for communication with another hearing device in a binaural hearing device system, and/or for communication with other electronic devices, such as smart phones etc.

However, there is a need for an improved hearing device providing communication with other hearing devices or electronic devices.

SUMMARY

It is an object to provide a hearing device with improved wireless communication capabilities, such as improved wireless communication capabilities with other hearing devices or electronic devices.

Radio connectivity between hearing devices may allow for advanced binaural signal processing when the ear-to-ear (E2E) link is ensured. Furthermore, the hearing devices may be connected to a plethora of electronic devices or accessories, that can be either body-worn or placed in the user's proximity, and hence to the internet as part of the so-called internet of things (IoT). It is a desire to ensure a stable E2E link. The 2.4 GHz ISM band may be preferred due to the presence of many harmonized standards for low-power communications, such as BLE or ZigBee, its worldwide availability for industrial use, and the trade-off between power consumption and range that can be achieved. Thus, the 2.4 GHz band may be used for hearing device communication. Now, the 1.6 GHz ISM band may also be made available for use with hearing devices.

The E2E link may fulfil requirements on the wearable antenna design and performance. In order to achieve a good on-body performance, the antenna may exhibit optimal radiation efficiency, bandwidth, polarization, and radiation pattern, while the volume available for the design is reduced, as most times space comes at a premium in wearable devices such as in all types of hearing devices. Furthermore, mass production and industrial design needs may demand the antenna to furthermore be low-profile, lightweight, and inexpensive to manufacture. Various overall constrains may be relevant. The efficiency may be jeopardized by the proximity of the antenna to the human head, as the body tissues have high losses above 1.5 GHz, such as around 1.6 GHz and around 2.4 GHz due to the high water content. This may critically impact the overall performance given the magnitude of the drop in efficiency and the fact that the hearing device radios may operate in ultra-low-power regime. Another issue threatening antenna efficiency is the little volume available for the design, as this necessarily brings the antenna in close physical, hence, electrical as well, proximity of other parts of the device, with a strong likelihood of coupling to them. A large bandwidth is as well hard to achieve for an electrically small antenna due to its fundamental limits. The bandwidth may cover at least the whole 2.4 GHz ISM band, such as a bandwidth of 2.45 GHz+/−2.5%, such as 2.45 GHz+/−5% and/or a bandwidth around 1.6 GHz, such as a bandwidth of 1.6 GHz+/−2.5%, such as 1.6 GHz+/−5%, but a larger bandwidth may help to compensate for the detuning of the antenna caused by the body, that varies across users.

In accordance with the present disclose, the above-mentioned and other objects are obtained by a hearing device and a method.

Disclosed is a hearing device comprising a signal processor. The signal processor is configured for determining a hearing device mode of operation. The hearing device mode comprises a first mode and a second mode. The hearing device comprises a wireless communication unit. The hearing device may comprise a first wireless communication unit and a second wireless communication unit. The hearing device comprises an antenna for emission and reception of electromagnetic radiation. The antenna may be an electrical antenna for emission and reception of electromagnetic radiation. The antenna is configured to resonate at a first frequency. The hearing device comprises an active matching device. The active matching device is configured to interconnect the first and the second wireless communication unit with the antenna. The active matching device in the first mode is configured to enable the antenna to emit and receive electromagnetic radiation at the first frequency. The active matching device may in the second mode be configured to adjust antenna characteristics of the antenna to enable the antenna to emit and receive electromagnetic radiation at the second frequency.

The hearing device as disclosed provides the advantage that the antenna, which is configured to resonate at the first frequency, may also be configured to resonate at the second frequency. Thus, in the first mode of operation, the active matching device enables the antenna to emit and receive electromagnetic radiation at the first frequency, and in the second mode of operation, the active matching device enables the antenna to emit and receive electromagnetic radiation at the second frequency. Thus, it is an advantage that the antenna may emit and receive electromagnetic radiation at a first frequency and additionally at a second frequency. It is an advantage that the antenna may emit and receive electromagnetic radiation at a first frequency in the first mode and at a second frequency in the second mode. Thus, it is an advantage that a same antenna, such as one antenna, such as one electrical antenna, may enable the hearing device to communicate wirelessly with other hearing devices or electronic devices at different or multiple frequencies, such as at more than one frequency, such as at a first frequency and at a second frequency.

An electrical antenna of a certain actual or physical size, e.g. such as a certain length and/or volume, may emit and receive electromagnetic radiation at a certain frequency, with/at a certain antenna efficiency, such as radiation efficiency, polarization, bandwidth, and radiation pattern.

It is an advantage that the antenna is enabled to emit and receive at more than one frequency without the need to change the physical size of the antenna. In other words, it is an advantage that the active matching device provides that the antenna is enabled to emit and receive at the first frequency when the hearing device is in a first mode of operation and that the antenna is enabled to emit and receive at the second frequency when the hearing device is in a second mode of operation, without changing the physical size of the antenna.

In some embodiments, the antenna is enabled to emit and receive at more than one frequency without losing antenna efficiency, such as at least without losing a significant or substantial amount or degree of antenna efficiency. In other words, the active matching device may provide that the antenna is enabled to emit and receive at the first frequency when the hearing device is in a first mode of operation and that the antenna is enabled to emit and receive at the second frequency when the hearing device is in a second mode of operation, without losing antenna efficiency, such as at least without losing a significant amount of antenna efficiency, neither for the first frequency nor for the second frequency.

In some embodiments, enabling the antenna to emit and receive at the first frequency when the hearing device is in the first mode of operation imply that the antenna efficiency at the first frequency is above a first threshold efficiency. In some embodiments, enabling the antenna to emit and receive at the second frequency when the hearing device is in the second mode of operation imply that the antenna efficiency at the second frequency is above a second threshold efficiency.

In some embodiments, the first threshold efficiency and the second threshold efficiency is a same threshold efficiency. The active matching device may thus provide that, i.e. be configured so that, the antenna is enabled to emit and receive at the first frequency when the hearing device is in a first mode of operation and that the antenna is enabled to emit and receive at the second frequency when the hearing device is in a second mode of operation, without losing antenna efficiency, such as at least without losing a significant amount of antenna efficiency, neither for the first frequency nor for the second frequency.

In some embodiments, the first threshold efficiency and the second threshold efficiency are different. In some embodiments, the first threshold efficiency is higher than the second threshold efficiency. In some embodiments the first threshold efficiency is 10% higher than the second threshold efficiency, such as at least 10% higher than the second threshold efficiency.

In some embodiments, the active matching device and the antenna may be jointly configured. In some embodiments, the active matching device and the antenna may be jointly configured so as to reach at least the first threshold efficiency in the first mode, and at least the second threshold efficiency in the second mode.

In some embodiments, the antenna is configured to optimize the antenna efficiency at the first frequency. For example, the physical implementation of the antenna may be configured to optimize the antenna efficiency at the first frequency. In some embodiments, the antenna is configured to have resonance at the first frequency. In some embodiments, the physical implementation of the antenna is selected so that the antenna has a resonance, i.e. a resonant response, at the first frequency. Typically, configuring an antenna to have an optimized efficiency at a first frequency comes as a trade-off so that the antenna efficiency at another frequency, including the second frequency, will be lower. It is an advantage that by including an active matching device, the antenna efficiency at the second frequency may be improved.

The head of a user or a wearer of a hearing device may act as an obstacle to the propagation of sound waves. Furthermore, the head of the user may act as an obstacle to the propagation of radio frequency (RF) waves or signal. This effect depends on the frequency or wavelength of the signal. The effect of the head is lower or smaller for wavelengths that are long compared to the size of the head, and the effect of the head is higher or greater for wavelengths that are short compared to the size of the head. Thus, when designing a hearing device configured for wireless communication at radio frequencies, typically, also the effect of the head of the user as an obstacle at a given radio frequency is considered, especially for long range wireless communication, such as broadcasting. Optimizing a hearing device for wireless communication at a given radio frequency, requires that antenna characteristics and/or antenna configuration, among other things, may be optimized.

It is an advantage that the hearing device may be optimized for wireless communication with other hearing devices or electronic devices at the first frequency, such that e.g. an antenna efficiency at the first frequency may be higher than an antenna efficiency at the second frequency, or such that e.g. an antenna polarization or radiation pattern at the first frequency may be optimized for circumventing the challenges provided by the proximity of the antenna to the human head.

It is an advantage that the hearing device may be optimized for wireless communication with other hearing devices or other electronic devices at both the first frequency and the second frequency. In some embodiments, optimizing the hearing device for wireless communication with other hearing devices or electronic devices at both the first frequency and the second frequency may result in an antenna efficiency at the first frequency being equal to or the same as an antenna efficiency at the second frequency, e.g. such as approximately equal to or substantially the same as an antenna efficiency at the second frequency.

In some embodiments, optimizing the hearing device for wireless communication with other hearing devices or electronic devices at both the first frequency and the second frequency may result in a first antenna efficiency at the first frequency being higher than an antenna efficiency at the second frequency.

In some embodiments, the hearing device may use the 2.4 GHz ISM band and/or the 1.6 GHz ISM band. Thus, in some embodiments, the first frequency is selected in the 2.4 GHz ISM band, and the second frequency is selected in the 1.6 GHz ISM band. It is an advantage that the hearing device may communicate wirelessly with hearing devices or electronic devices at two different frequencies, such as at a first frequency and at a second frequency. It is an advantage that the hearing device may communicate wirelessly with hearing devices or electronic devices using the 2.4 GHz ISM band and/or the 1.6 GHz ISM band.

The hearing device may be configured for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

Thus, it is an advantage that the hearing device provides improved communication with other hearing devices, such as another hearing device in a binaural hearing device system, or external electronic devices, such as smart phones etc.

The hearing device may comprise a first transducer, i.e. microphone, to generate one or more microphone output signals based on a received audio signal. The hearing device comprises a signal processor. The one or more microphone output signals may be provided to the signal processor for processing the one or more microphone output signals. The hearing device may comprise a receiver or speaker or loudspeaker. The receiver may be connected to an output of the signal processor for converting the output of the signal processor into a signal modified to compensate for a user's hearing impairment, and may provide the modified signal to the receiver.

The hearing device may be any hearing device, such as any hearing device compensating a hearing loss of a user of the hearing device, or such as any hearing device providing sound to a user. The person skilled in the art is well aware of different kinds of hearing devices and of different options for arranging the hearing device in and/or at the ear of the user of the hearing device.

For example, the hearing device may be a behind-the-ear (BTE) hearing device, in which a behind-the-ear module comprises the hearing device components provided as an assembly and mounted in a housing being configured to be worn behind the ear of a user in the operational position. Typically, a sound tube extends from the hearing device housing to the ear canal of the user.

For example, the hearing device may be a receiver-in-the-ear type hearing device, in which a receiver is positioned in the ear, such as in the ear canal, of a user during use, for example as part of an in-the-ear module, while other hearing device components, such as the processor, the wireless communication unit, the battery, etc. are provided as a behind-the-ear module. Typically, a tube connects the in-the-ear module and the behind-the-ear module. It should be envisaged that the tube module comprising the tube, may comprise further hearing instrument components and connectors.

For example, the hearing device may be an in-the-ear or completely-in-the-canal type hearing device in which the hearing device is provided in the ear of a user. Thus, an in-the-ear module comprises the hearing device components, including the processor, the wireless communication unit, the battery, the microphone and speaker, etc. The in-the-ear module may have one or more parts extending into the ear canal. The in-the-ear module may thus be configured to be positioned in the ear and in the ear canal.

The hearing device comprises a signal processor. The signal processor may be a digital signal processor (DSP). The signal processor may comprise elements such as an amplifier, a compressor and/or a noise reduction system etc. The signal processor may be implemented in a signal processing chip. The signal processor may be provided at/on a printed circuit board, e.g. such as arranged or mounted at/on a printed circuit board. The signal processing chip and/or the printed circuit board may comprise further electronic components. The hearing device may further comprise a filter function, such as a compensation filter for optimizing the output signal.

In the present disclosure, the signal processor is configured for determining a hearing device mode of operation. The hearing device mode comprises a first mode of operation and a second mode of operation. The signal processor may be configured to provide a control signal to the active matching device, the control signal providing information about the hearing device mode of operation.

In some embodiments, the signal processor is configured to select the first mode of operation for a first type of wireless communication, and to select the second mode of operation for a second type of wireless communication. In some embodiments, the first mode of operation is selected for a type of wireless communication requiring high efficiency. In some embodiments, the first mode of operation is selected for low power communication. In some embodiments, the first mode of operation is used for communication with a hearing device at another ear of the user. In some embodiments, the second mode of operation is used for communication with another external electronic device. In some embodiments, the first mode of operation may be selected for wireless communication having a specific requirement to the latency. In some embodiments, the first mode of operation may be selected for wireless communication requiring low latency, such as e.g. for enabling audio streaming.

The hearing device may communicate wirelessly with other hearing devices or electronic devices at the first frequency in the first hearing device mode of operation. The hearing device may communicate wirelessly with other hearing devices or electronic devices at the second frequency in the second hearing device mode of operation.

The hearing device may comprise a wireless communication unit. The hearing device may comprise a first wireless communication unit and a second wireless communication unit. In some embodiments, the first wireless communication unit and the second wireless communication unit are implemented as a same wireless communication unit. The hearing device may comprise a first and a second wireless communication unit, such as a first wireless communication unit and a second wireless communication unit. The wireless communication unit may be implemented as a wireless communication circuit. The first and the second wireless communication unit may be implemented as a first and a second wireless communication circuit, respectively. The wireless communication unit may be configured for wireless communication, including wireless data communication, and may in this respect be interconnected with the antenna for emission and reception of an electromagnetic field. The first and second wireless communication units may be configured for wireless communication, including wireless data communication, and are in this respect interconnected with the antenna for emission and reception of an electromagnetic field. The wireless communication unit, such as the first and second wireless communication units, may be configured for interconnecting the signal processor with the antenna for providing wireless communication with other hearing devices and/or other external electronic devices.

Each wireless communication unit may comprise a transmitter, a receiver, a transmitter-receiver pair, such as a transceiver, a radio unit, etc. Each wireless communication unit may be configured for communication using any protocol as known for a person skilled in the art, including Bluetooth, including Bluetooth Low Energy, Bluetooth Smart, etc., WLAN standards, manufacture specific protocols, such as tailored proximity antenna protocols, such as proprietary protocols, such as low-power wireless communication protocols, such as CSR mesh, etc.

The hearing device comprises an antenna for emission and reception of electromagnetic radiation. In some embodiments, the antenna is an electrical antenna. The antenna is configured to resonate at the first frequency. In some embodiments, the antenna is a resonant antenna at the first frequency. It is an advantage of operating the antenna at or close to the resonance frequency, such as at the frequency at which the antenna is resonant, as the efficiency of the antenna may be at or proximate a maximum efficiency at the resonant frequency. A resonant antenna may have, such as substantially or approximately, pure resistance without any reactance (capacitive or inductance) at an antenna feed point. Thus, it is an advantage that the antenna may be a resonant antenna at the first frequency as this may provide an improved impedance interface, such as an improved impedance matching or impedance bridging, between the antenna and the first wireless communication unit in the first mode.

The antenna may be an electrical antenna. The antenna may be configured for operation at radio frequencies, such as at radio frequencies above 800 MHz, such as above 1 GHz, such as above 1.5 GHz. The antenna may be configured for operation at radio frequencies, such as in one or more ISM frequency bands. The antenna may be any antenna capable of operating at these frequencies. The antenna may be implemented in any way, and the antenna may be a monopole antenna, a dipole antenna, etc. The antenna may be a loop antenna, such as an open loop antenna. The antenna may be any antenna as known, such as any electrical antenna, and the antenna may be, or may comprise, an elongated conducting material, the elongated conducting material being configured to emit or receive electromagnetic radiation in any known way.

In some embodiments, the antenna may resonate, such as be a resonant antenna, at the first frequency in the first mode of operation and the active matching device may be configured to provide that the antenna may resonate, such as be a resonant antenna, at the second frequency in the second mode of operation. Thus, two electromagnetic signals, such as radiation signals, having different frequencies may be emitted and/or received by the antenna. The antenna may be interconnected with the first wireless communication unit and with the second wireless communication unit.

The antenna may be provided in an antenna configuration, e.g. such as an antenna arrangement or setup. The antenna configuration may comprise the antenna. The antenna configuration may further comprise the active matching device. The term antenna configuration may be used to describe how the antenna is configured or arranged or provided in the hearing device, such as how the antenna is connected and/or excited etc.

The hearing device comprises the active matching device. The active matching device is configured to interconnect the first wireless communication unit and the second wireless communication unit with the antenna. Thus, the active matching device may be arranged between the antenna and the first and the second wireless communication unit. The active matching device may be an active matching device, rather than a passive matching device, as the active matching device may be configured to receive a control signal from the signal processor. The active matching device may comprise a switch, such as one or more switches, such as at least one switch. The one or more switches may be configured to remove or restore a conducting path in a circuit when operated. The one or more switches may be configured to comprise a set or a pair of contacts, such as one or more sets of contacts, which may be configured to operate simultaneously, e.g. such as operate sequentially or alternately. The one or more switches may be any kind or type of switch, such as for example a single-throw switch, a double-throw switch, a changeover switch, a "single-pole, single-throw" (SPST) switch, or a "single-pole, double-throw" switch (SPDT). The one or more switches may be different types of switches, such as one switch being one type of switch and another switch being another type of switch. Thus, the one or more switches may provide that the active matching device may be configured for switching between at least two conducting paths, such as at least two electrical circuits, such as at least two matching circuits. The switching may be determined by or dependent on the hearing device mode of operation, such as determined by a control signal that may provide information regarding or pertaining to the hearing mode of operation. The control signal may be provided by or from the signal processor.

The active matching device in the first mode is configured to enable the antenna to emit and receive electromagnetic radiation at the first frequency. The active matching device in the second mode is configured to adjust, such as modify or alter or tune or change, antenna characteristics of the antenna to enable the antenna to emit and receive electromagnetic radiation at the second frequency. Thus, in the first mode of operation, the active matching device may interconnect, such as connect, the first wireless communication unit to/with the antenna. In the second mode of operation, the active matching device may interconnect, such as connect, the second wireless communication unit with the antenna. Thus, the active matching device may interconnect the antenna with the first wireless communication unit or the second wireless communication unit, depending on the hearing device mode of operation. In other words, in the first mode, the active matching device may provide that the antenna is interconnected with the first wireless communication unit and the active matching device may provide that the antenna may emit and receive electromagnetic radiation, such as signals, at the first frequency. In the second mode, the active matching device may provide that the antenna is interconnected with the second wireless communication unit and the active matching device may provide that the antenna may emit and receive electromagnetic radiation, such as signals, at the second frequency.

The first frequency may be 2.4 GHz. The second frequency may be 1.6 GHz. Although the disclosure refers to electromagnetic radiation at a certain frequency, such as at a first frequency and at a second frequency, it is readily apparent to those skilled in the art that electromagnetic radiation, such as an electromagnetic signal, emitted and/or received by an antenna has a certain band or bandwidth. The bandwidth comprises a continuous band of frequencies, and the bandwidth may be defined by a centre frequency. Thus, the first frequency may be a first centre frequency having a first bandwidth. The first centre frequency may be 2.4 GHz, such as 2.35 GHz or 2.44 GHz. The first bandwidth may be 2.3 GHz-2.5 GHz. The second frequency may be a second centre frequency having a second bandwidth. The second centre frequency may be 1.6 GHz, such as 1.55 GHz or 1.64 GHz. The second bandwidth may be 1.5 GHz-1.7 GHz.

In some embodiments, the active matching device is configured to adjust one or more of the following antenna characteristics: antenna impedance, electrical length of the antenna, and radiation efficiency. The antenna characteristics may additionally comprise gain and radiation intensity. The one or more antenna characteristics may for example be adjusted through a change in current distribution on the antenna, such as a change in current amplitude on the antenna. Adjustment of one or more antenna characteristics may in turn, such as implicitly or inherently, change further properties of the antenna radiation properties, and may for example change a radiation pattern and/or a polarization and/or a directivity of the antenna.

Thus, the active matching device may be configured to adjust one or more antenna characteristics. The skilled person will know that antenna design for a compact device, such as a hearing device, is a significant challenge, due to both practical and fundamental design tradeoffs relating to antenna characteristics. The skilled person will know that antenna characteristics may be related to each other such that a change of one of the antenna characteristic may provide a change of other antenna characteristics as well.

The antenna characteristics for the antenna in the second mode of operation may be different from or dissimilar to the antenna characteristics in the first mode of operation, such as one or more of the antenna characteristics for the antenna in the second mode of operation may be different from one or more of the antenna characteristics in the first mode of operation.

Alternatively or additionally, one or more of the antenna characteristics for the antenna in the second mode of operation may be the same as or equal to, such as substantially or approximately equal to, one or more of the antenna characteristics in the first mode of operation.

Alternatively or additionally, an electrical length of the antenna in the second mode may be different from an electrical length of the antenna in the first mode.

Alternatively or additionally, an impedance of the antenna in the first mode may be the same as or equal to, such as substantially or approximately equal to, an impedance of the antenna in the second mode.

It is an advantage that the active matching device is configured to adjust one or more of the antenna characteristics, as this provides that the antenna is enabled to emit and receive electromagnetic radiation at the second frequency. Thus, adjusting one or more of the antenna characteristics, provides that the antenna may resonate at or proximate the second frequency. It is an advantage that, adjusting one or more antenna characteristics provides that the hearing device may be configured for wireless communication with other hearing devices or electronic devices at both the first frequency and the second frequency.

It is an advantage that the active matching device is configured to adjust one or more of the antenna characteristics, as this provides flexibility when designing the hearing device and particularly as this enables communication at the first frequency and the second frequency using a same antenna, such as a same electrical antenna. As hearing devices are under heavy constraints with respect to the size of the hearing devices, it is an advantage of being able to use one antenna for communication at more frequencies, such as at the first frequency and the second frequency.

It is an advantage that one or more of the antenna characteristics may be adjusted, as this provides that one or more of the antenna characteristics may be optimized in a mode of operation, such as in the first mode or in the second mode, or in both modes of operation. It is a further advantage, that a same one or more of the antenna characteristic may not need to be optimized in both modes. For example, a radiation efficiency may be optimized for the first mode, while a radiation efficiency may not be optimized for the second mode. Alternatively, for example, a radiation efficiency may be optimized for both the first mode and the second mode.

In other words, it is an advantage that by adjusting one or more antenna characteristics, the hearing device may be optimized for wireless communication with other hearing devices or electronic devices at the first frequency. Alternatively, it is an advantage that, by adjusting one or more antenna characteristics, the hearing device may be optimized for wireless communication with other hearing devices or electronic devices at both the first frequency and the second frequency.

In some embodiments, adjustment of the antenna characteristics changes a current distribution along the antenna and/or a frequency response of the antenna. The current distribution may comprise the amplitude of the current. Hereby, for example, adjusting or changing or modifying an electrical length of the antenna may adjust, change or modify the current distribution along the antenna. Alternatively or additionally, adjusting an electrical length of the antenna may change the frequency response of the antenna. Thus, the current distribution along the antenna and/or a frequency response of the antenna may be changed due to adjustment of one or more of the antenna characteristics.

It is an advantage that adjustment of the antenna characteristics changes a current distribution along the antenna and/or a frequency response of the antenna, as this provides flexibility when designing the hearing device. For example, a current distribution along the antenna may be optimized for the first mode, while a current distribution along the antenna may not be optimized for the second mode. Alternatively, for example, a current distribution along the antenna may be optimized for both the first mode and the second mode.

In some embodiments, the hearing device further comprises a diplexer interconnecting the first and second wireless communication units and the active matching device. The diplexer is configured to isolate or filter signals of the first frequency from signals of the second frequency. The diplexer may interconnect the first wireless communication unit with the active matching device. The diplexer may interconnect the second wireless communication unit with the active matching device. The diplexer may be provided between the first and second wireless communication units and the active matching device, and the active matching device may be provided between the diplexer and the antenna. Thus, the diplexer may be configured to interconnect, such as connect, the antenna with the first and second wireless communication units, respectively. The diplexer may be a passive device that implements frequency-domain multiplexing. It is an advantage that the diplexer provides that the same active matching device may be used for the first and the second wireless communication units. The diplexer may be any suitable data splitter or selector known to the skilled person, for example a multiplexer or a filter. Hereby, the diplexer may be implemented as a band pass filter, a low pass filter, a high pass filter, a surface acoustic wave (SAW) filter, a band stop filter, a notch filter, and/or a bulk acoustic wave (BAW) filter.

By providing the diplexer between the first and second wireless communication unit and the active matching device, the signals provided to the active matching device are diplexed signals. Hereby, any signals from the active matching device are provided directly to the antenna without intermediate processing. Hereby, any adjustments of one or more antenna characteristics, such as antenna impedance, electrical length of the antenna, and radiation efficiency are provided to the antenna without additional processing. Furthermore, providing the diplexer between the first and second wireless communication unit and the active matching device may reduce losses in the diplexer as the diplexer receives an impedance matched signal from the antenna, i.e. an impedance matched signal from the antenna provided via the active matching device.

In some embodiments, the active matching device comprises a first matching circuit. The first matching circuit is configured to match the impedance of the antenna with the first wireless communication unit in the first mode. In the first mode of operation, the first matching circuit, such as a first electrical matching network or a first antenna tuner, may adjust or match the impedance of the antenna with/to an impedance of the first wireless communication unit. It is an advantage that the first matching circuit of the active matching device may provide an impedance-matched interface between the antenna and the first wireless communication unit. An impedance-matched interface between the antenna and the first wireless communication unit may prohibit reflection and may provide an efficient power transfer to/from the antenna.

In some embodiments, the active matching device comprises a second matching circuit. The second matching circuit comprises a primary matching circuit configured to match an impedance of the antenna with the second wireless communication unit and a secondary matching circuit configured to adjust antenna characteristics of the antenna to match the second frequency in the second mode. The second matching circuit, such as a second electrical matching network or a second antenna tuner, may be configured to match an impedance of the antenna with an impedance of the second wireless communication unit. Additionally, the second matching circuit may be configured to adjust antenna characteristics of the antenna to match the second frequency. In the second mode of operation, the primary matching circuit of the second matching circuit may adjust or match the impedance of the antenna with an impedance of the second wireless communication unit. In the second mode of operation, the secondary matching circuit of the second matching circuit may be configured to adjust one or more of the antenna characteristics of the antenna to match the second frequency. Thus, one or more of the antenna characteristics may be adjusted, thereby providing that the antenna may resonate at the second frequency.

It is an advantage that the second matching circuit, such as the primary matching circuit of the second matching circuit, of the active matching device provides an impedance-matched interface between the antenna and the second wireless communication unit. An impedance-matched interface between the antenna and the second wireless communication unit may prohibit reflection and may provide an efficient power transfer to/from the antenna. Furthermore, it is an advantage that the second matching circuit, such as the secondary matching circuit of the second matching circuit, of the active matching device provides that the antenna may be resonant at the second frequency. Thus, it is an advantage that the second matching circuit, such as the secondary matching circuit of the second matching circuit, of the active matching device provides that a resonance frequency of the antenna may be changed from the first frequency to the second frequency, e.g. such that the resonance frequency of the antenna may be adjusted or altered from the first frequency to the second frequency.

It is an advantage that the second matching circuit provides that the impedance of the antenna is matched with the impedance of the second wireless communication unit while also providing simultaneously, such as at the same time, that antenna characteristics of the antenna are adjusted to match the second frequency, such that the antenna may resonate at the second frequency.

In some embodiments, the first matching circuit and the primary matching circuit is a same matching circuit. Thus, the first matching circuit and the primary matching circuit of the second matching circuit may be a same matching circuit. In other words, the first matching circuit may be the same as, e.g. such as identical or equal to, the primary matching circuit. It is an advantage that the first matching circuit and the primary matching circuit is a same matching circuit, as this provides that the first matching circuit may be used as the primary matching circuit or that the primary matching circuit may be used as the first matching circuit. It is an advantage that electrical components of a circuit, such as the first matching circuit and/or the primary matching circuit, may be used, such as provided, for both the first mode of operation and the second mode of operation. This reduces the space or volume needed for electrical component or circuits provided in the hearing device.

In some embodiments, the first matching circuit and/or the primary matching circuit are configured to connect the first and second wireless communication unit, respectively and the antenna, to improve power transfer between them by matching the specified load impedance of the first and second wireless communication unit, respectively to the input impedance of the antenna, potentially including any input impedance of transmission lines.

In some embodiments, each of the first matching circuit and the second matching circuit comprises one or more components, such as at least one component, selected from the group of: resistors, capacitors, inductors, diodes and transistors. The primary and the secondary matching circuits of the second matching circuit may comprise one or more components selected from the group of: resistors, capacitors, inductors, diodes and transistors. The one or more components of the first matching circuit may be different from the one or more components of the second matching circuit. Alternatively, at least one component of the one or more components of the first matching circuit may be similar or identical to at least one component of the one or more components of the second matching circuit. Furthermore, at least one component of the one or more components of the first matching circuit may be a same component as at least one component of the one or more components of the second matching circuit. For example, the first matching circuit may comprise an inductor, the second matching circuit may comprise the inductor and a capacitor. Alternatively or additionally, at least one component of the one or more components of the first matching circuit may be a same component as at least one component of the one or more components of the primary matching circuit and may be different from at least one component of the secondary matching circuit. In one example, the first matching circuit may comprise at least an inductor, the primary matching circuit may comprise at least the inductor, and the secondary matching circuit may comprise at least a capacitor.

In some embodiments, the signal processor is configured to provide a control signal to the active matching device in response to the determination of the hearing device mode. Thus, the signal processor may determine the mode of operation and provide a control signal with this information to the active matching device The control signal may be a digital signal using logic or logical levels. The control signal may comprise binary numbers 1 and 0.

In some embodiments, the active matching device is configured to switch between the first matching circuit and the second matching circuit according to the control signal. The active matching device may be configured to receive the control signal. The active matching device may be configured to switch between the first matching circuit and the second matching circuit in response to receiving the control signal, the control signal comprising information regarding the hearing device mode of operation, such as operation mode. Thus, when the signal processor determines that the hearing device should change the operation mode from the first mode of operation to the second mode of operation, the signal processor may provide a control signal with this information to the active matching device, and in response to this control signal, the active matching device may switch to the second matching circuit, such that the antenna may be interconnected with the second wireless communication unit and such that antenna characteristics of the antenna may be adjusted to enable the antenna to emit and receive electromagnetic radiation at the second frequency. Likewise, when the signal processor determines that the hearing device should change the operation mode from the second mode of operation to the first mode of operation, the signal processor may provide a control signal with this information to the active matching device and in response to this control signal, the active matching device may switch to the first matching circuit, such that the antenna may be interconnected with the first wireless communication unit and such that the antenna may be enabled to emit and receive electromagnetic radiation at the first frequency. It is an advantage that the active matching device is configured to switch between the first matching circuit and the second matching circuit according to the control signal, as this provides that the hearing device may be configured to switch between the first and the second mode of operation. It is an advantage that the hearing device may be configured to operate in two modes, such as in the first mode or in the second mode. Thus, it is an advantage that the hearing device may be configured to communicate wirelessly with other hearing devices or electronic devices in the first mode or in the second mode, and that the hearing device may be configured to switch between the first mode and the second mode while communicating wirelessly with other hearing devices or electronic devices.

In some embodiments, the antenna in the first mode is configured to have an electrical length corresponding to a full wavelength, such as to a full wavelength +/−10%, at the first frequency.

In some embodiments, the antenna in the second mode is configured to have an electrical length corresponding to half a wavelength, such as to a half wavelength +/−10%, such as to a half wavelength +/−25%, at the second frequency. The antenna in the second mode may be configured to have an electrical length of the antenna of between 10%-25% larger than a half wavelength at the second frequency. The antenna in the second mode may be configured to have an electrical length of the antenna of between 10%-25% shorter than a half wavelength at the second frequency.

An electrical length of an antenna may be different from a physical length of the antenna. An electrical length of an antenna may be adjusted without changing a physical length of the antenna. An electrical length of an antenna may be changed by providing components in series with the antenna. An electrical length of an antenna may be changed by the active matching device. The active matching device may be configured to increase the electrical length of the antenna. The active matching device may be configured to decrease the electrical length of the antenna. In some embodiments, the secondary matching circuit is configured to change the electrical length of the antenna, such as to increase the electrical length of the antenna or such as to decrease the electrical length of the antenna.

It is an advantage that, in the first mode, the antenna may perform as a full-wavelength antenna, such as substantially or approximately as a full-wavelength antenna.

Furthermore, it is an advantage that, in the second mode, the antenna may perform as a half-wavelength antenna, such as substantially or approximately as a half-wavelength antenna. Thus, it is an advantage that the active matching device may be configured to adjust the electrical length of the antenna, such that the electrical length of the antenna in the first mode corresponds to a full wavelength +/−10% at the first frequency, and such that the electrical length of the antenna in the second mode corresponds to a half wavelength +/−10% at the second frequency, or e.g. such that the electrical length of the antenna in the second mode corresponds to a half wavelength +/−25% at the second frequency.

In some embodiments, the first frequency and the second frequency are different frequencies. In some embodiments, the first frequency is higher than the second frequency. The second frequency is equal to or higher than half the first frequency. The first frequency may be higher than the second frequency. The second frequency may be equal to half the first frequency, e.g. such that the second frequency may be the same as or of equal value to half the first frequency. The second frequency may be higher than half the first frequency.

In some embodiments, the first frequency and the second frequency have a same order of magnitude. In some embodiments, the first frequency corresponds to two times the second frequency. In some embodiments, the first frequency is different from two times the second frequency. In some embodiments, the first frequency is between 1,1 and 1,9 times the second frequency. In some embodiments, the first frequency is between 1⅓ and 1⅔ of the second frequency. In some embodiments, the difference between the first frequency and the second frequency is less than half the second frequency, such as about half the second frequency.

For example, the first frequency may be 2.4 GHz, and the second frequency may be equal to or higher than half the first frequency, such as 1.2 GHz, such as 1.3 GHz, such as 1.4 GHz, such as 1.5 GHz, such as 1.6 GHz, such as 1.7 GHz, such as 1.8 GHz, such as 1.9 GHz. In a preferred embodiment the second frequency may be 1.6 GHz.

In some embodiments, the antenna characteristics of the antenna in the second mode are adjusted to obtain a resonant antenna at the second frequency, or at a frequency being within +/−20% of the second frequency. In other words, in the second mode, the antenna may resonate or may be a resonate antenna at the second frequency, or at a frequency being within +/−20% of the second frequency, such as substantially or approximately at the second frequency.

It is an advantage that the antenna may be a resonant antenna, or substantially a resonant antenna, at the second frequency in the second mode, as a resonant antenna may have, such as substantially or approximately, pure resistance without any reactance (capacitive or inductance) at the antenna feed point. Thus, it is an advantage that the antenna may be a resonant antenna at the second frequency as this may provide an improved impedance interface, such as an improved impedance matching or impedance bridging, between the antenna and the second wireless communication unit in the second mode.

The hearing device may comprise a housing. The housing of the hearing device may be a behind-the-ear housing configured to be positioned behind the ear of the user during use. The housing may comprise a first side and a second side. The first side of the housing may be arranged opposite the second side of the housing. The first side of the housing may e.g. be a first longitudinal side of the hearing device, and the second side of the housing may be e.g. a second longitudinal side of the hearing device. The antenna may be accommodated in the housing with a longitudinal direction of the antenna extending along the length of the housing. The antenna may be accommodated within the hearing device housing, preferably so that the antenna is positioned inside the hearing device housing without protruding out of the housing.

The antenna may be arranged, such as provided or accommodated, in the hearing device. The hearing device may comprise a first side and a second side. The first side may be arranged opposite the second side. The first side of the hearing device may e.g. be a first longitudinal side of the hearing device, and the second side of the hearing device may be e.g. a second longitudinal side of the hearing device. The antenna may be accommodated in the hearing device with a longitudinal direction of the antenna extending along the length of the hearing device.

The antenna may be arranged in the hearing device such that at least a part of the antenna extends from the first side of the hearing device to the second side of the hearing device. The antenna may comprise one more sections or parts. The one or more sections may be connected and may form a loop. A section of the antenna, such as a first section, may be provided or arranged at the first side of the hearing device. A section of the antenna, such as a second section, may be provided or arranged at the second side of the hearing device. In some embodiments, a section of the antenna, such as a third section, may be provided or arranged at a top part of the hearing device. The third section may connect the first and the second section of the antenna. The top part of the hearing device may be a longitudinal top part of the hearing device. The top part of the hearing device may be facing substantially, such as approximately upwards when the hearing device is worn in its operational position at an ear of the user.

In some embodiments, the antenna in the first mode is configured to have a maximum current, such as a maximum value of a current, at a section of the antenna being parallel to an ear-to-ear axis of a user when the hearing device is worn in its operational position at an ear of the user. Thus, in the first mode, a current distribution along the antenna may be distributed such that a current provided along the antenna may have a maximum value at the section of the antenna being parallel to an ear-to-ear axis of a user when the hearing device is worn in its operational position at an ear of the user. Additionally, in the second mode of operation, the antenna may also be configured to have a maximum current at the section of the antenna being parallel to an ear-to-ear axis of a user when the hearing device is worn in its operational position at an ear of the user. The maximum current in the second mode may have an amplitude different from the amplitude of the maximum current in the first mode.

The section of the antenna being parallel to an ear-to-ear axis of a user when the hearing device is worn in its operational position at an ear of the user, may be the third section of the antenna and may be provided at a top part of the hearing device.

In some embodiments, the current flowing in the antenna may form standing waves along the electrical length of the antenna. Thus, the section of the antenna having maximum current, such as the location or position or area of maximum current, will be at the maximum of an standing wave of current along the electrical length of the antenna.

It is an advantage that the antenna in the first mode may be configured to have a maximum current at a section of the antenna being parallel to an ear-to-ear axis of a user when the hearing device is worn in its operational position at an ear of the user, as this may provide that at least a part of an electromagnetic field emitted by the antenna may propagate along the surface of the head of the user and around the head of the user. It is a further advantage that an electrical field of this electromagnetic field may have an orientation that may be substantially orthogonal to the surface of the head of the user. In other words, the electrical field of the emitted electromagnetic field may be higher in a orthogonal direction to the head of the user.

Furthermore, it is an advantage that the antenna in the first mode may be configured to have a maximum current at a section of the antenna being parallel to an ear-to-ear axis of a user when the hearing device is worn in its operational position at an ear of the user, as this may provide that a polarization of the electromagnetic field may have an orientation that may be substantially orthogonal to the surface of the head of the user. In other words, the polarization of the electromagnetic field may be higher in an orthogonal direction to the head of the user.

The provided orthogonal direction of the electrical field is an advantage as it is optimal to excite a strong surface wave, i.e. electromagnetic wave, along the body, such as along the face or head of the user, such as to the other ear of the user. The provided orthogonal direction of the polarization of the antenna and of the electrical field may be optimized to excite a strong electromagnetic field with a large range. Thus, the antenna in the first mode being configured to have a maximum current at a section of the antenna being parallel to an ear-to-ear axis of a user when the hearing device is worn in its operational position at an ear of the user, may be an advantage as this may provide that loses due to interactions with the surface of the head of the user are minimized. This may be an advantage as it may provide a wireless communication which is more robust to impairments and furthermore may provide an improved transmission and reception that supports the circumvention of the obstacle presented by the head of the user.

In some embodiments, the antenna comprises a first end. The first end of the antenna may be connected to a feed, such as a first feed, at a first side of the hearing device. In some embodiments, the antenna comprises a second end. The second end of the antenna may be connected to a ground potential at a second side of the hearing device. The second side of the hearing device may be opposite the first side of the hearing device. The antenna may have a first electrical length. A section of the antenna extending from the first side of the hearing device to the second side of the hearing device may be at approximately half the first electrical length.

In some embodiments, the section of the antenna extending from the first side of the hearing device to the second side of the hearing device at approximately half the first electrical length, may be a same section as the third section of the antenna and may be provided at a top part of the hearing device.

This may be advantageous as this may provide that loses due to interactions with the surface of the head of the user are minimized. Thus, this may provide a wireless communication which is more robust to impairments and furthermore provides an improved transmission and reception that supports the circumvention of the obstacle presented by the head of the user.

The antenna configuration may be configured so as to obtain a desired current distribution along the antenna. The feed, such as a first feed, and a connection to the ground potential may be configured so as to obtain a desired current distribution along the antenna. In some embodiments, the feed, such as a first feed, and the connection to the ground potential may be adjacent each other, or may be positioned relatively close to each other. In some embodiments, the feed and the connection to the ground potential may be arranged in a way supporting the desired current distribution while reducing any impediments of the implementation.

Alternatively, the second end may be connected to a feed, such as a second feed, provided at the second side of the hearing device. Alternatively, the second end may be connected to a feed, such as a second feed, provided at the first side of the hearing device. Alternatively, the first end may be connected to a first feed and the second end may be connected to a second feed and both ends and feeds may be provided at the second side of the hearing device. The first feed and second feed respectively, may be configured so as to obtain a desired current distribution. For example, the first feed and the second feed may be adjacent each other, or may be positioned relatively close to each other.

The feed may be a feed point or an excitation point. A feed may be electrically connected to a source, such as the first or second wireless communication unit, a radio chip, such as a transceiver, a receiver, a transmitter, etc. The antenna may be excited using any conventional means, e.g. such as using a direct or an indirect or coupled feed. The antenna may be fed using a feed line, such as a transmission line.

The second end of the antenna may be connected to the ground potential through or via a ground plane. The ground plane may be formed in any material capable of conduction a current upon excitation of the antenna. The ground plane may be a printed circuit board. The ground plane may also be formed as a single conducting path of e.g. copper, for guiding the current. The ground potential may be a zero potential or a relative ground potential.

The first end of the antenna may be an end of the first section of the antenna provided at the first side of the hearing device. The second end of the antenna may be an end of the second section of the antenna provided at the second side of the hearing device. The section of the antenna extending from the first side of the hearing device to the second side of the hearing device may the third section of the antenna. In the first mode and second mode, the third section of the antenna may be at approximately half the first electrical length. In the first mode, the third section of the antenna may be at approximately half a wavelength corresponding to the first frequency. In the second mode, the third section of the antenna may be at approximately one fourth of a wavelength corresponding to the second frequency.

According to an aspect, disclosed is a method of operating a hearing device. The hearing device comprises a signal processor. The hearing device comprises a first and a second wireless communication unit. The hearing device comprises an antenna for emission and reception of electromagnetic radiation. The antenna is configured to resonate at a first frequency. The antenna may be an electrical antenna. The hearing device comprises an active matching device. The method comprises determining in the signal processor a hearing device mode of operation, the hearing device mode comprises a first mode and a second mode. The method comprises, in the first mode, interconnecting the first wireless communication unit with the antenna via the active matching device. The method comprises, in the first mode, enabling the antenna to emit and receive electromagnetic radiation at the first frequency. The method comprises, in the second mode, and interconnecting the second wireless communication unit with the antenna via the active matching device. The method comprises, in the second mode, adjusting antenna characteristics of the antenna to enable the antenna to emit and receive electromagnetic radiation at the second frequency.

The present disclosure may be further characterized by the following items:

1. A hearing device comprising
   - a signal processor, the signal processor being configured for determining a hearing device mode of operation, the hearing device mode comprising a first mode and a second mode,
   - a first wireless communication unit and a second wireless communication unit,
   - an electrical antenna for emission and reception of electromagnetic radiation, the antenna being configured to resonate at a first frequency,
   - an active matching device configured to interconnect the first and the second wireless communication unit with the antenna,
   - wherein the active matching device in the first mode is configured to enable the antenna to emit and receive electromagnetic radiation at the first frequency and wherein the active matching device in the second mode is configured to adjust antenna characteristics of the antenna to enable the antenna to emit and receive electromagnetic radiation at the second frequency.
2. A hearing device according to item 1, wherein the active matching device is configured to adjust one or more of the following antenna characteristics: antenna impedance, electrical length of the antenna, and radiation efficiency.
3. A hearing device according to any of the preceding items, wherein adjustment of the antenna characteristics changes a current distribution along the antenna and/or a frequency response of the antenna.
4. A hearing device according to any of the preceding items, further comprising a diplexer interconnecting the first and second wireless communication units and the active matching device, the diplexer being configured to isolate signals of the first frequency from signals of the second frequency.
5. A hearing device according to any of the preceding items, wherein the active matching device comprises a first matching circuit being configured to match the impedance of the antenna with the first wireless communication unit in the first mode.
6. A hearing device according to item 5 when dependent on item 4, wherein the active matching device comprises a second matching circuit having a primary matching circuit configured to match an impedance of the antenna with the second wireless communication unit and a secondary matching circuit configured to adjust antenna characteristics of the antenna to match the second frequency in the second mode.
7. A hearing device according to item 6 when dependent on item 5, wherein the first matching circuit and the primary matching circuit is a same matching circuit.
8. A hearing device according to any of items 5-7, wherein each of the first matching circuit and the second matching circuit comprises one or more components selected from the group of: resistors, capacitors, inductors, diodes and transistors.

9. A hearing device according to any of the preceding items, wherein the signal processor is configured to provide a control signal to the active matching device in response to the determination of the hearing device mode.
10. A hearing device according to item 8, wherein the active matching device is configured to switch between the first matching circuit and the second matching circuit according to the control signal.
11. A hearing device according to any of the preceding items, wherein the antenna in the first mode is configured to have an electrical length corresponding to a full wavelength +/−10% at the first frequency.
12. A hearing device according to any of the preceding items, wherein the antenna in the second mode is configured to have an electrical length corresponding to half a wavelength +/−10%, such as +/−25%, at the second frequency.
13. A hearing device according to any of the preceding items, wherein the first frequency is higher than the second frequency, and wherein the second frequency is equal to or higher than half the first frequency.
14. A hearing device according to any of the preceding items, wherein the antenna characteristics of the antenna in the second mode are adjusted to obtain a resonant antenna at the second frequency, or at a frequency being within +/−20% of the second frequency.
15. A hearing device according to any of the preceding items, wherein the antenna in the first mode is configured to have a maximum current at a section of the antenna being parallel to an ear-to-ear axis of a user when the hearing device is worn in its operational position at an ear of the user.
16. A hearing device according to any of the preceding items, wherein the antenna has a first end, the first end being connected to a feed at a first side of the hearing device, and wherein the antenna has a second end, the second end being connected to a ground potential at a second side of the hearing device, the second side being opposite the first side; wherein the antenna has a first electrical length, and wherein a section of the antenna extending from the first side to the second side is at approximately half the first electrical length.
17. A method of operating a hearing device, the hearing device comprising
    - a signal processor, a first and a second wireless communication unit, an antenna for emission and reception of electromagnetic radiation, the antenna being configured to resonate at a first frequency, and an active matching device, the method comprising determining in the signal processor a hearing device mode of operation, the hearing device mode comprising a first mode and a second mode, wherein, in the first mode:

interconnecting the first wireless communication unit with the antenna via the active matching device, and enabling the antenna to emit and receive electromagnetic radiation at the first frequency, and wherein, in the second mode:

interconnecting the second wireless communication unit with the antenna via the active matching device, and adjusting antenna characteristics of the antenna to enable the antenna to emit and receive electromagnetic radiation at the second frequency.

The present disclosure relates to different aspects including the hearing device and method described above and in the following, and corresponding systems, hearing devices, hearing aids, hearing protection devices, methods, and system parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
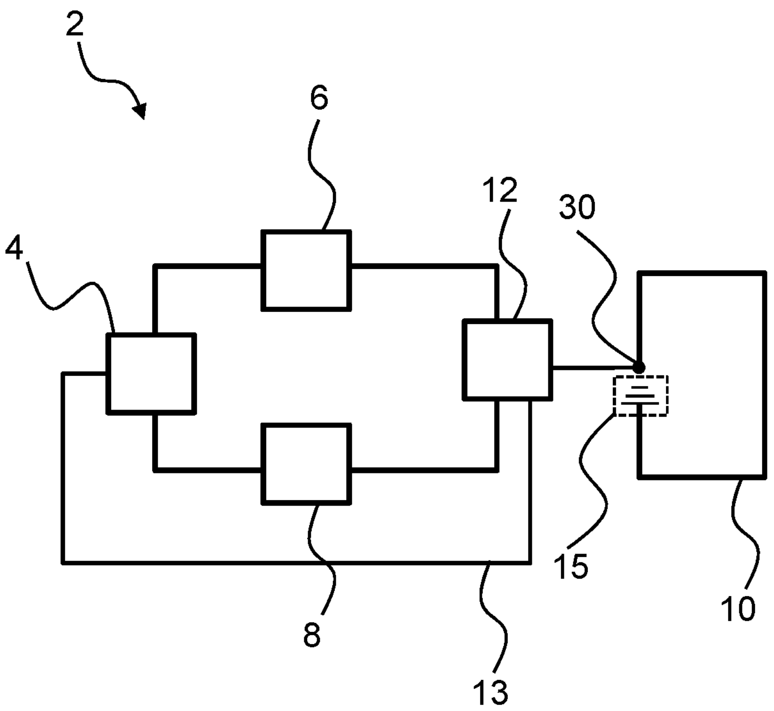
FIG. 1 schematically illustrates an exemplary hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an exemplary hearing device 2. The hearing device 2 comprises a signal processor 4. The signal processor 4 is configured for determining a hearing device mode of operation. The hearing device mode comprises a first mode and a second mode. The hearing device 2 comprises a first wireless communication unit 6 and a second wireless communication unit 8. The hearing device 2 comprises an electrical antenna 10 for emission and reception of electromagnetic radiation. The antenna 10 is configured to resonate at a first frequency. The hearing device 2 comprises an active matching device 12. The active matching device 12 is configured to interconnect the first wireless communication unit 6 and the second wireless communication unit 8 with the antenna 10. The active matching device 12 in the first mode is configured to enable the antenna 10 to emit and receive electromagnetic radiation at the first frequency. The active matching device 12 in the second mode is configured to adjust antenna characteristics of the antenna 10 to enable the antenna 10 to emit and receive electromagnetic radiation at the second frequency.

In some embodiments, the antenna characteristics of the antenna in the second mode are adjusted to obtain a resonant antenna at the second frequency, or at a frequency being within +/−20% of the second frequency.

In some embodiments, the active matching device 12 is configured to adjust one or more of the following antenna characteristics: antenna impedance, electrical length of the antenna, and radiation efficiency.

In some embodiments, adjustment of the antenna characteristics changes a current distribution along the antenna and/or a frequency response of the antenna.

The signal processor 4 is configured to provide a control signal 13 to the active matching device 12 in response to the determination of the hearing device mode. The control signal 13 may be a digital signal using logic or logical levels, such as binary numbers 1 and 0.

The antenna 10 may be a loop antenna, as illustrated in FIG. 1. The antenna is shown to comprise a feed 30 and to be connected to a ground potential 15.

Figure 2:
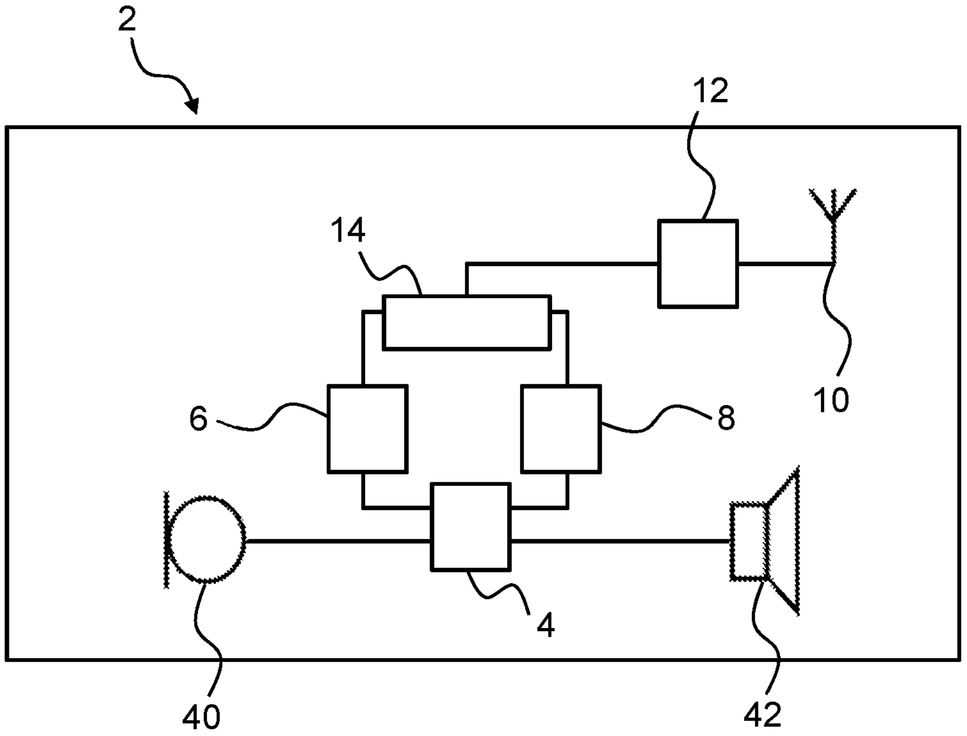
FIG. 2 schematically illustrates an exemplary hearing device.

FIG. 2 illustrates a block diagram of the hearing device 2. The hearing device 2 comprises a transducer 40, i.e. microphone, to generate one or more microphone output signals based on a received audio signal. The one or more microphone output signals are provided to the signal processor 4 for processing the one or more microphone output signals. The hearing device 2 further comprises a receiver 42, i.e. speaker or loudspeaker. The receiver 42 is connected to an output of the signal processor 4 for converting the output of the signal processor 4 into a signal modified to compensate for a user's hearing impairment, and the signal processor 4 provides the modified signal to the receiver 42.

As shown in FIG. 2, the hearing device 2 further comprises a first wireless communication unit 6 and a second wireless communication unit 8. The hearing device 2 comprises an antenna 10 for emission and reception of electromagnetic radiation. The antenna 10 is configured to resonate at a first frequency. The hearing device 2 comprises an active matching device 12. The active matching device 12 is configured to interconnect the first wireless communication unit 6 and the second wireless communication unit 8 with the antenna 10. The signal processor 4 is configured for determining a hearing device mode of operation. The hearing device mode comprises a first mode and a second mode. The active matching device 12 in the first mode is configured to enable the antenna 10 to emit and receive electromagnetic radiation at the first frequency. The active matching device 12 in the second mode is configured to adjust antenna characteristics of the antenna 10 to enable the antenna 10 to emit and receive electromagnetic radiation at the second frequency.

As shown in FIG. 2, the hearing device 2 optionally further comprises a diplexer 14 interconnecting the first wireless communication unit 6 and second wireless communication unit 8 and the active matching device 12. The diplexer 14 is configured to isolate or filter signals of the first frequency from signals of the second frequency.

FIGS. 3*a-d* schematically illustrate exemplary implementation of a hearing device 2 comprising an active matching device 12 according to an embodiment of the present disclosure.

Figure 3A:
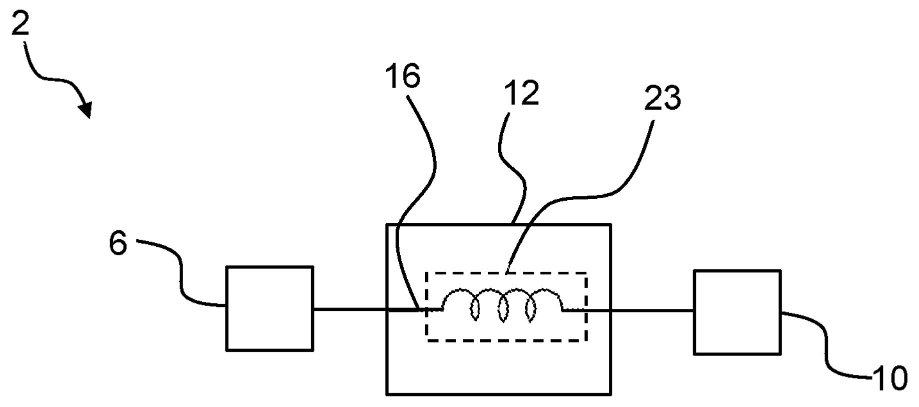
FIGS. 3A-3E schematically illustrate exemplary implementations of a hearing device comprising an active matching device according to some embodiments, FIGS. 4A-4C schematically illustrate exemplary implementations of a hearing device comprising an antenna according to some embodiments, FIG. 5 schematically illustrates an exemplary method of active antenna switching in a hearing device.

In FIG. 3*a*, the active matching device 12 is connected to the antenna 10 and the first wireless communication unit 6. The hearing device 2 may further comprise a diplexer (not shown) interconnecting the first wireless communication unit 6 and the active matching device 12. The active matching device may be connected to the first wireless communication unit 6 via a diplexer (not shown).

In FIG. 3*a*, the active matching device 12 comprises a first matching circuit 16. The first matching circuit 16 is configured to match the impedance of the antenna 10 with the first wireless communication unit 6 in the first mode. In FIG. 3*a*, the first matching circuit 16 comprises an inductor 23.

Figure 3B:
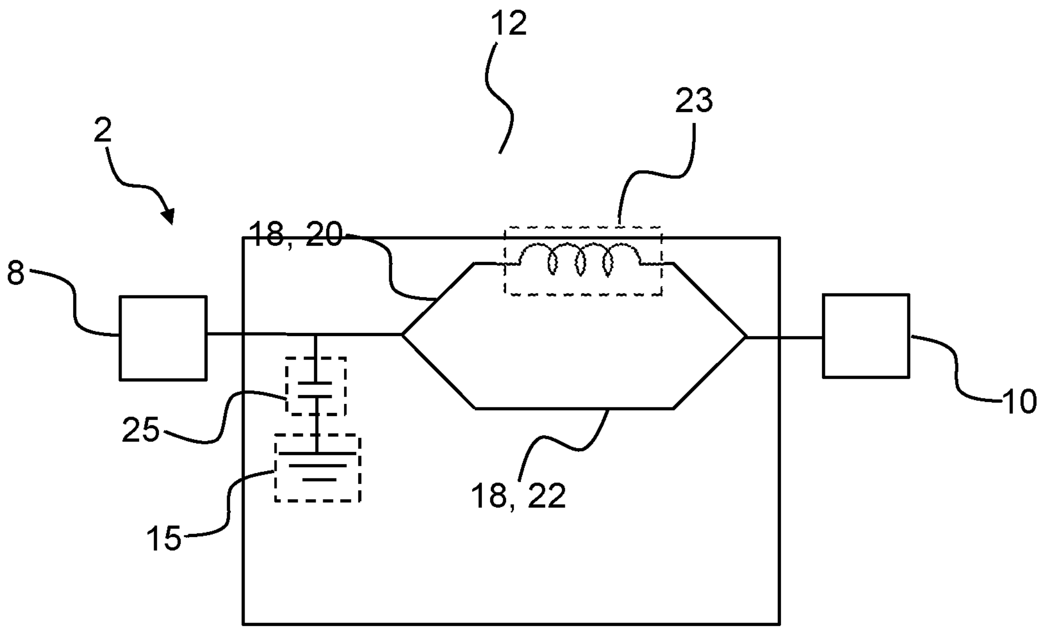

In FIG. 3*b*, the active matching device 12 is connected to the antenna 10 and the second wireless communication unit 8. The hearing device 2 may further comprise a diplexer (not shown) interconnecting the second wireless communication unit 8 and the active matching device 12. The active matching device may be connected to the second wireless communication unit 8 via a diplexer (not shown).

In FIG. 3*b*, the active matching device 12 comprises a second matching circuit 18. The second matching circuit 18 comprises a primary matching circuit 20 configured to match an impedance of the antenna 10 with the second wireless communication unit 8 and a secondary matching circuit 22 configured to adjust antenna characteristics of the antenna 10 to match the second frequency in the second mode. In FIG. 3*b*, the second matching circuit 18 comprises an inductor 23 and a capacitor 25. Thus, the primary matching circuit 20 comprises the inductor 23 and the secondary matching circuit 22 comprises the capacitor 25. The capacitor 25 is connected to a ground potential 15.

Figure 3C:
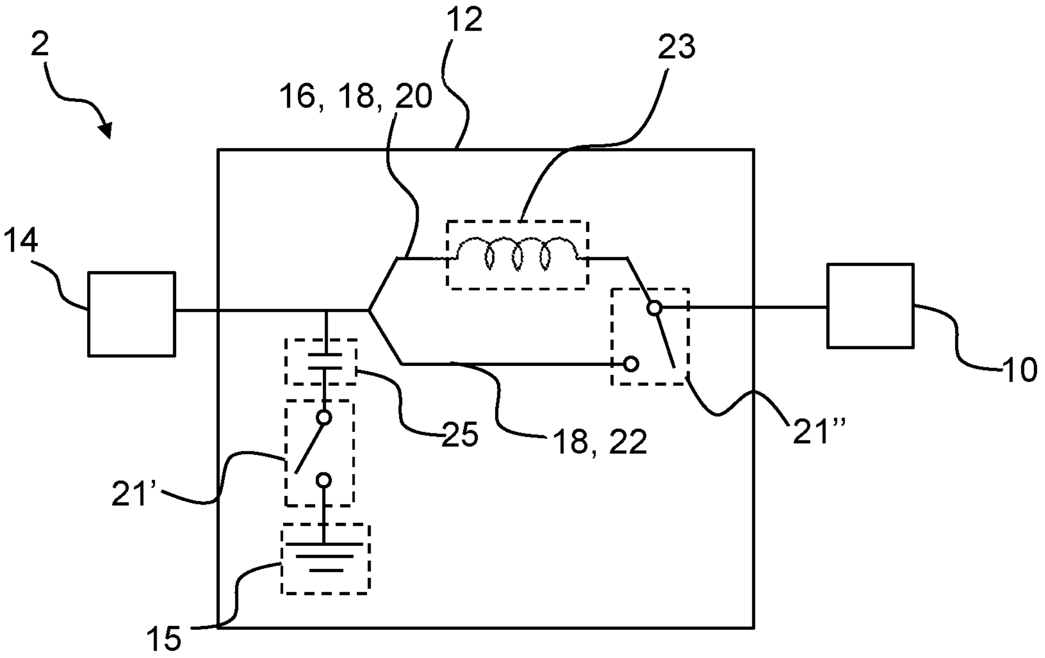
Figure 3D:
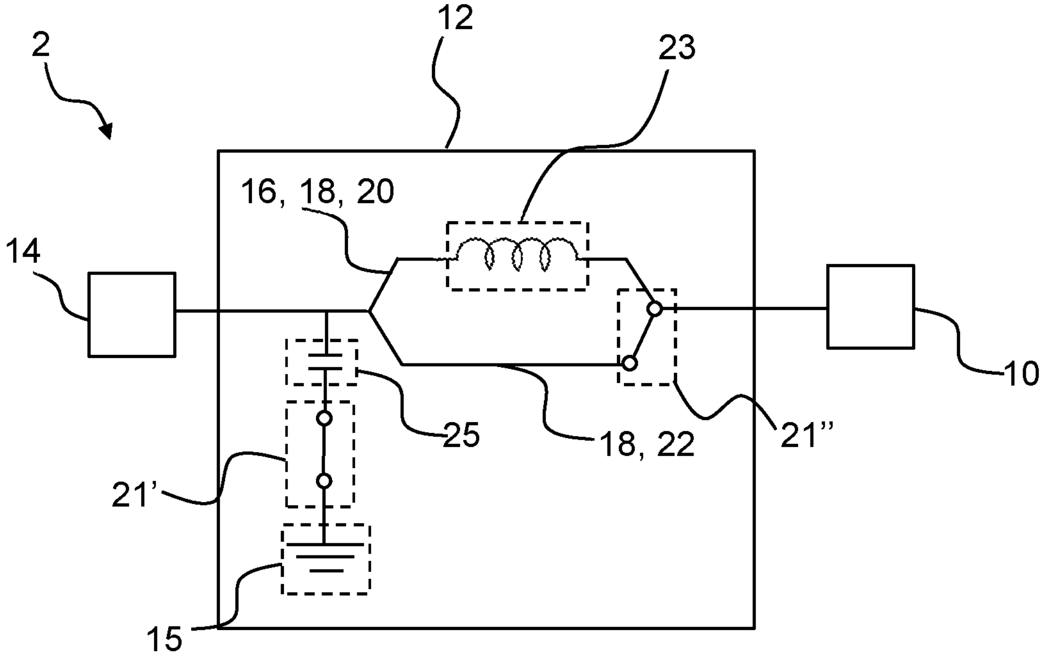
Figure 3E:
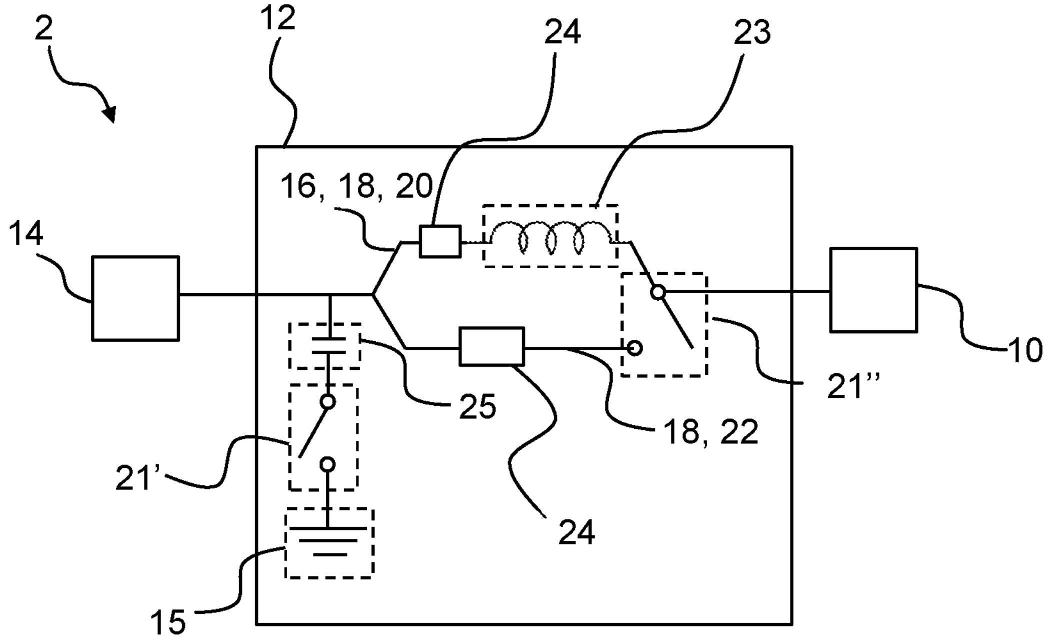

In FIGS. 3*c*, 3*d* and 3*e*, the active matching device 12 comprises a first matching circuit 16 and a second matching circuit 18. The active matching device 12 is connected to an antenna 10 and a diplexer 14. Alternatively, the active matching device may be connected to the first and second wireless communication units (not shown). The active matching device 12 may be configured to receive a control signal (not shown) from a signal processor (not shown). An example of the active matching device being connected to the first and the second wireless communication units, and of the active matching device being configured to receive a control signal from a signal processor can be seen in FIG. 1.

In FIGS. 3*c*, 3*d* and 3*e*, the first matching circuit 16 comprises an inductor 23. The second matching circuit 18 comprises an inductor 23 and a capacitor 25. The capacitor 25 is connected to a ground potential 15.

In FIGS. 3*c*, 3*d* and 3*e*, the active matching device 12 is shown as comprising two switches 21', 21". Both switches 21', 21" are shown as "single pole, single throw" (SPST) switches. The active matching device 12 is configured to switch between the first matching circuit 16 and the second matching circuit 18 according to the control signal. Thus, the active matching device is configured to switch between the first matching circuit 16 when the hearing device is in the first mode and the second matching circuit 18 when the hearing device is in the second mode.

FIG. 3*c* illustrates the active matching device 12 when the hearing device is in the first mode of operation. FIG. 3*c* shows that, when the switches 21', 21" are open, a current will flow in a first matching circuit 16. In the first mode of operation, the first matching circuit 16 is configured to match the impedance of the antenna 10 with the first wireless communication unit (not shown).

When the switches 21', 21" are open, a current will also flow in the in the primary matching circuit 20 of a second matching circuit. FIG. 3*c* illustrates that a current flowing in the first matching circuit 16 may be a same current flowing as in the primary matching circuit 20 of a second matching circuit 18. Thus, the first matching circuit 16 and the primary matching circuit 20 is a same matching circuit. The inductor 23 of the first matching circuit 16 is a same inductor as the inductor 23 of the primary matching circuit 20.

FIG. 3*d* illustrates the active matching device 12 when the hearing device is in the second mode of operation. FIG. 3*d* shows that when the switches 21', 21" are closed, a current will flow in a primary matching circuit 20 and a secondary matching circuit 22 of the second matching circuit 18. In the second mode of operation, the primary matching circuit 20 is configured to match an impedance of the antenna 10 with the second wireless communication unit (not shown) and the secondary matching circuit 22 is configured to adjust antenna characteristics of the antenna 10 to match the second frequency. FIG. 3*d* shows, like FIG. 3*c*, that a current flowing in the primary matching circuit 20 of a second matching circuit 18 may be a same current flowing as in the first matching circuit 16. Thus, the first matching circuit 16 and the primary matching circuit 20 is a same matching circuit.

In FIG. 3*e*, the switches 21', 21" are shown as open. Alternatively, the switches 21', 21" may also be closed. The first matching circuit 16 is shown as comprising an inductor 23 and optionally a further component 24, such as a resistor, capacitor, inductor, diode or transistor. The secondary matching circuit 22 of the second matching circuit 18 is shown as comprising an capacitor 25 and optionally a further component 24. Thus, FIG. 3*e* illustrates that each of the first matching circuit and the second matching circuit comprises one or more components selected from the group of: resistors, capacitors, inductors, diodes and transistors.

FIG. 4 schematically illustrates an exemplary hearing device 2 comprising an antenna 10, a wireless communication unit 6, 8 and a ground plane 15. In a first mode of operation, the wireless communication unit may be a first wireless communication unit 6. In a second mode of operation, the wireless communication mode may be a second wireless communication unit 8. The hearing device may comprise an active matching device (not shown) configured to interconnect the first and second wireless communication unit 6, 8 with the antenna 10, and the hearing device 2 may further comprise a diplexer (not shown) configured for interconnecting the first and second wireless communication units 6, 8 and the active matching device. In a first mode of operation, the antenna 10 may be interconnected with the first wireless communication unit 6. In a second mode of operation, the antenna 10 may be interconnected with the second wireless communication unit 8. The antenna 10 may have a connection to a ground potential 15.

The antenna 10 may be arranged in the hearing device 2 such that at least a part of the antenna 10 extends from a first side of the hearing device 2 to a second side of the hearing device. The antenna may comprise one more sections. The one or more sections may be connected and may form a loop, as illustrated in FIG. 4. A section of the antenna, such as a first section 44, may be provided or arranged at the first side of the hearing device 2. A section of the antenna, such as a second section 46, may be provided or arranged at the second side of the hearing device 2. A section of the antenna, such as a third section 48, may connect the first 44 and the second section 46 of the antenna 10. The third section 48 may be provided or arranged at a top part of the hearing device. The top part of the hearing device 2 may be a longitudinal top part of the hearing device 2. The top part of the hearing device 2 may be facing substantially, such as approximately upwards when the hearing device 2 is worn in its operational position at an ear of the user.

In some embodiments, the antenna in the first mode is configured to have an electrical length corresponding to a full wavelength +/−10% at the first frequency.

In some embodiments, the antenna in the second mode is configured to have an electrical length corresponding to half a wavelength +/−10% at the second frequency.

In some embodiments, the first frequency is higher than the second frequency. The second frequency is equal to or higher than half the first frequency.

In some embodiments, the antenna 10 in the first mode is configured to have a maximum current, such as a maximum value of a current, at a section 26 of the antenna being parallel to an ear-to-ear axis of a user when the hearing device is worn in its operational position at an ear of the user. In the first mode, a current distribution along the antenna 10 may be distributed such that a current provided along the antenna 10 may have a maximum value at the section 26 of the antenna 10 being parallel to an ear-to-ear axis of a user when the hearing device 2 is worn in its operational position at an ear of the user. As illustrated in FIG. 4, the section 26 of the antenna 10 being parallel to an ear-to-ear axis of a user when the hearing device 2 is worn in its operational position at an ear of the user, may be a same section of the antenna 10 as the third section 48 of the antenna 10 and may be provided at a top part of the hearing device 2.

Figure 4A:
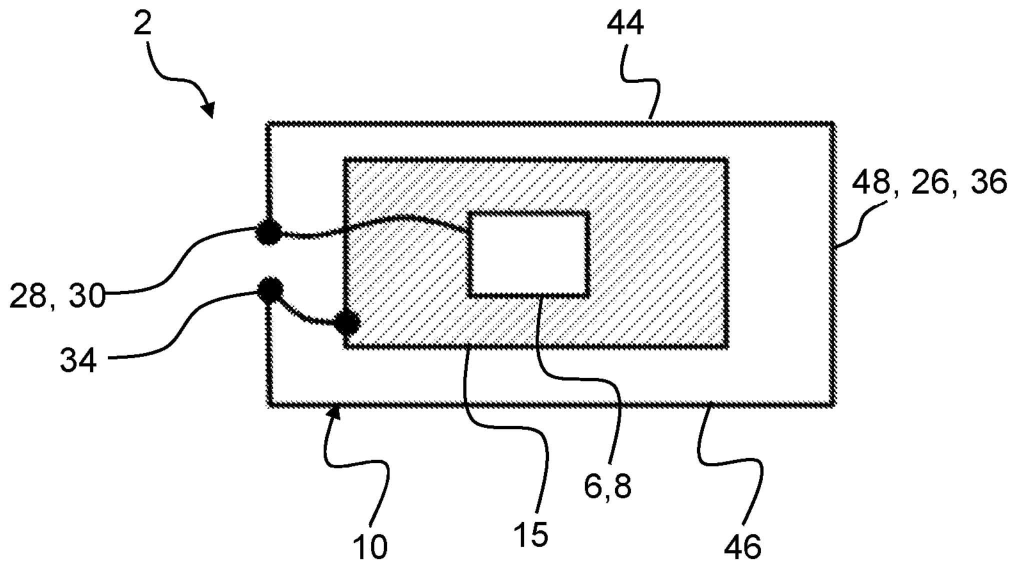
Figure 4B:
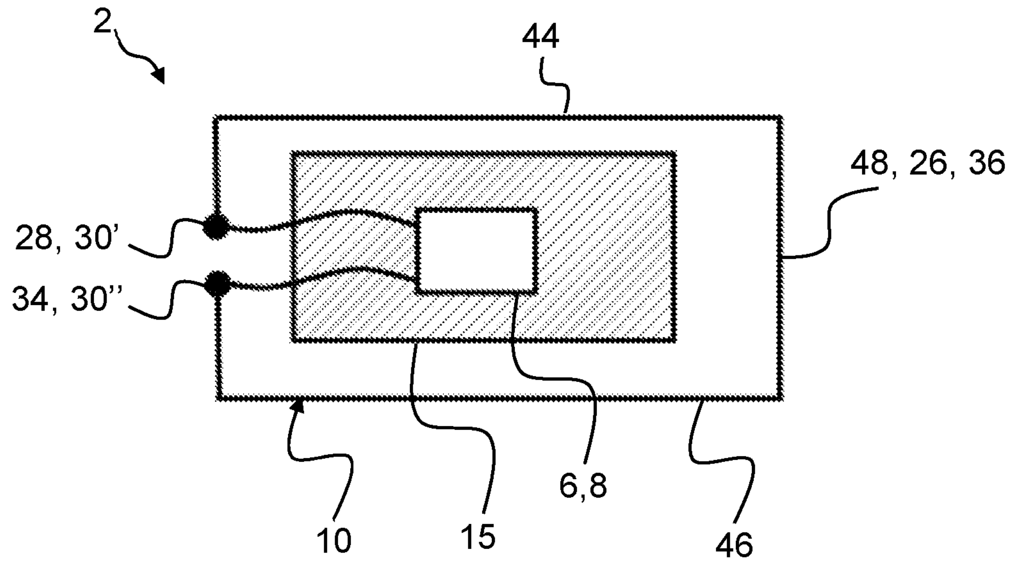
Figure 4C:
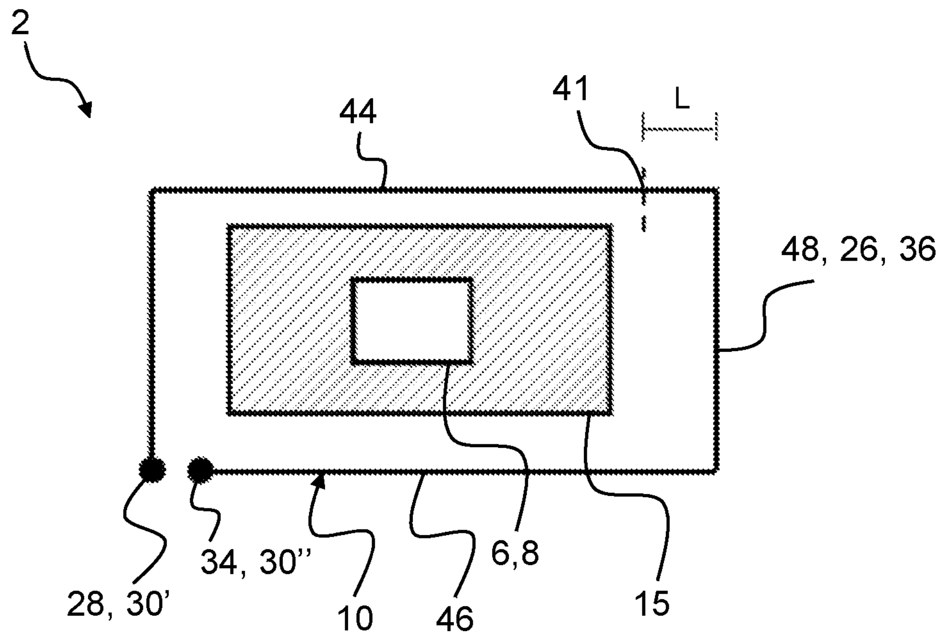

FIGS. 4*a*, 4*b* and 4*c* schematically illustrate three examples of antenna configurations.

FIG. 4*a* schematically illustrates an exemplary antenna configuration for an exemplary hearing device 2. The antenna 10 has a first end 28. The first end 28 is illustrated as connected via a transmission line to the wireless communication units 6, 8. The first end 28 of the antenna 10 is connected to a feed 30 at the first side of the hearing device. The antenna 10 comprises a second end 34. The second end 34 is illustrated as connected to a ground potential 15 via a transmission line. The antenna has a first electrical length. A section 36 of the antenna extending from the first side of the hearing device to the second side of the hearing device is at approximately half (e.g., 50%+/−10%) the first electrical length.

As illustrated in FIG. 4*a*, the section 36 of the antenna 10 connecting the first section 44 and the second section 46 of the antenna is provided at approximately half the first electrical length. Hereby, in the first mode of operation, the antenna may be configured to have a maximum current at approximately half the first electrical length.

FIG. 4*b* schematically illustrates an example of antenna configuration for an exemplary hearing device 2. The antenna 10 comprises a first end 28. The first end 28 is illustrated as connected via transmission line to the wireless communication unit 6, 8. The first end 28 of the antenna 10 is connected to a feed 30' at a first side of the hearing device 2. The antenna 10 comprises a second end 34. The second end 34 is illustrated as connected to the wireless communication unit 6, 8. The second end 34 of the antenna 10 is connected to a feed 30" at the second side of the hearing device 2. The first feed 30' and the second feed 30" may be first and second connections to the wireless communication unit 6, 8. The second side of the hearing device 2 is opposite the first side of the hearing device. The antenna has a first electrical length. A section of the antenna 36 extending from the first side of the hearing device to the second side of the hearing device may be at approximately half the first electrical length.

As illustrated in FIG. 4*b*, the section 36 of the antenna 10 may be a same section as the third section 48 of the antenna 10, and may a same section as the section 26 of the antenna 10. Thus, when the electrical length of the antenna 10 corresponds to a full wavelength, or corresponds approximately to a full wavelength, the current will have a maximum at the third section 36, that is at approximately half the first electrical length, corresponding to approximately half a wavelength. For example, in the first mode of operation, the antenna may be configured to have a maximum current at approximately half the first electrical length.

FIG. 4*c* schematically illustrates an example of antenna configuration for an exemplary hearing device 2. The antenna 10 comprises a first end 28. The first end 28 is connected to a feed 30 at the second side of the hearing device 2. The antenna comprises a second end 34. The second end 34 of the antenna 10 is connected to a feed 30" at the second side of the hearing device 2. Thus, the two feeds 30', 30" are provided or arranged on a same side of the hearing device 2. Alternatively, the two feeds 30', 30" may be provided at the first side of the hearing device 2. A part of the antenna 10 extends from the first side of the hearing device 2 to the second side of the hearing device 2. The second side of the hearing device 2 is opposite the first side of the hearing device 2. The antenna 10 comprises a first electrical length.

A part of the antenna 36 extending from the first side of the hearing device to the second side of the hearing device may be at approximately half the first electrical length.

As illustrated in FIG. 4*b*, the section 36 of the antenna 10 may be a same section as the third section 48 of the antenna 10, and may a same section as the section 26 of the antenna 10. Thus, when the electrical length of the antenna 10 corresponds to a full wavelength, or corresponds approximately to a full wavelength, the current will have a maximum at the third section 36, that is at approximately half the first electrical length, corresponding to approximately half a wavelength. For example, in the first mode of operation, the antenna may be configured to have a maximum current at approximately half the first electrical length.

A midpoint or center 41 of the first electrical length may be provided on the third section 48 of the antenna or may be provided in such a way that a distance from the midpoint 41 to the third section 48 of the antenna 10 is not longer than a quarter wavelength, thus λ/4. The distance from the midpoint 41 of antenna 10 and the third section 48 of the antenna is denoted L in FIG. 4*c* The structure of antenna 10 may be designed in such a way that the following holds:

$$\left|\frac{L-\lambda/4}{\lambda/4}\right| < T$$

The absolute relative difference between the distance L and the quarter of a wavelength λ/4 is less than a threshold, T, such as less than 10% or 25%.

Figure 5:
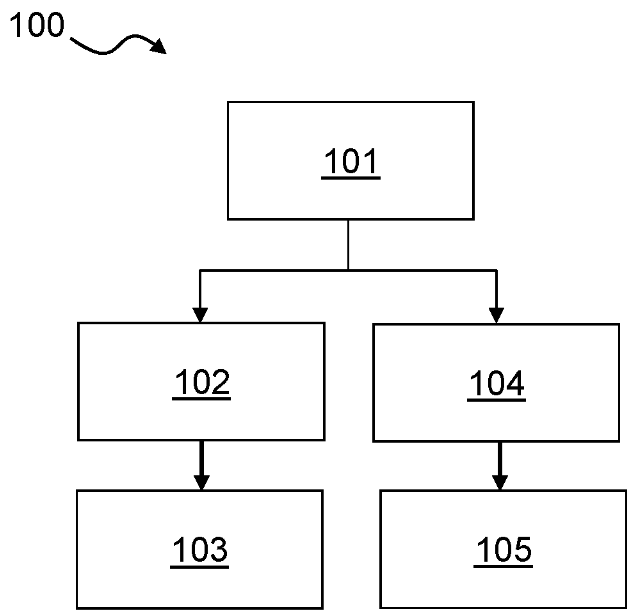

FIG. 5 shows a flow diagram, illustrating the method 100 of operating a hearing device and more specifically a method of active antenna switching in the hearing device. The hearing device comprises a first and a second wireless communication unit. The hearing device comprises an antenna for emission and reception of electromagnetic radiation. The antenna is configured to resonate at a first frequency. The hearing device comprises an active matching device.

In step 101 the signal processor determines a hearing device mode of operation, the hearing device mode comprises a first mode and a second mode.

In step 102, in the first mode, the first wireless communication unit is interconnected with the antenna via the active matching device.

In step 103, in the first mode, the antenna is enabled to emit and receive electromagnetic radiation at the first frequency.

In step 104, in the second mode, the second wireless communication unit is interconnected with the antenna via the active matching device.

In step 105, in the second mode, antenna characteristics of the antenna are adjusted to enable the antenna to emit and receive electromagnetic radiation at the second frequency.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES

2 hearing device
4 signal processor
6 first wireless communication unit
8 second wireless communication unit
10 antenna
12 active matching device
13 control signal
14 diplexer
15 ground potential
16 first matching circuit
18 second matching circuit
20 primary matching circuit
21 switch
22 secondary matching circuit
23 inductor
24 component
25 capacitor
28 first end
30, 30', 30" feed
34 second end
40 transducer
41 midpoint
42 receiver
44 first section of antenna
46 second section of antenna
48, 26, 36 third section of antenna
101 determining a hearing device mode of operation
102 in the first mode, interconnecting the first wireless communication unit with the antenna via the active matching device,
103 enabling the antenna to emit and receive electromagnetic radiation at the first frequency
104 in the second mode, interconnecting the second wireless communication unit is interconnected with the antenna via the active matching device.
105 adjusting antenna characteristics of the antenna to enable the antenna to emit and receive electromagnetic radiation at the second frequency.

The invention claimed is:

1. A hearing device comprising:

a processing unit configured to determine a hearing device mode of operation, the determined hearing device mode being a first mode or a second mode;

a first wireless communication unit and a second wireless communication unit;

an antenna;

an active matching device configured to couple the first and the second wireless communication units with the antenna;

wherein the active matching device in the first mode is configured to enable the antenna to perform electromagnetic radiation emission and electromagnetic radiation reception at a first frequency, and wherein the active matching device in the second mode is configured to adjust an antenna characteristic of the antenna to enable the antenna to perform electromagnetic radiation emission and electromagnetic radiation reception at a second frequency; and wherein the active matching device comprises a first matching circuit associated with the first wireless communication unit, and a second matching circuit associated with the second wireless communication unit.

2. The hearing device according to claim 1, wherein the antenna characteristic comprises at least one of: antenna impedance, electrical length of the antenna, or radiation efficiency.

3. The hearing device according to claim 1, wherein the adjusted antenna characteristic changes a current distribution along the antenna and/or a frequency response of the antenna.

4. The hearing device according to claim 1, further comprising a diplexer coupling the first and second wireless communication units with the active matching device, the diplexer configured to isolate signals in the first frequency from signals in the second frequency.

5. A hearing device comprising:

a processing unit configured to determine a hearing device mode of operation, the determined hearing device mode being a first mode or a second mode;

a first wireless communication unit and a second wireless communication unit;

an antenna;

an active matching device configured to couple the first and the second wireless communication units with the antenna;

wherein the active matching device in the first mode is configured to enable the antenna to perform electromagnetic radiation emission and electromagnetic radiation reception at a first frequency, and wherein the active matching device in the second mode is configured to adjust an antenna characteristic of the antenna to enable the antenna to perform electromagnetic radiation emission and electromagnetic radiation reception at a second frequency; and wherein the active matching device comprises a first matching circuit configured to match an impedance of the antenna with an impedance of the first wireless communication unit in the first mode.

6. The hearing device according to claim 5, wherein the active matching device comprises a second matching circuit configured to match the impedance of the antenna with an impedance of the second wireless communication unit in the second mode, wherein at least a part of the first matching circuit is different from at least a part of the second matching circuit.

7. The hearing device according to claim 1, wherein the active matching device is configured to match an impedance of the antenna with an impedance of the first wireless communication unit in the first mode, and to match the impedance of the antenna with an impedance of the second wireless communication unit in the second mode.

8. The hearing device according to claim 1, wherein each of the first matching circuit and the second matching circuit comprises one or more components selected from the group of: a resistor, a capacitor, an inductor, diode, and a transistor.

9. The hearing device according to claim 1, wherein the processing unit is configured to provide a control signal to the active matching device after the hearing device mode of operation is determined.

10. The hearing device according to claim 1, wherein the active matching device is configured to switch between the first matching circuit and the second matching circuit based on a control signal.

11. The hearing device according to claim 1, wherein the first frequency is higher than the second frequency, and wherein the second frequency is equal to or higher than half the first frequency.

12. The hearing device according to claim 1, wherein the antenna characteristic of the antenna in the second mode is adjusted to obtain a resonant antenna at the second frequency, or at a frequency being within +/−20% of the second frequency.

13. The hearing device according to claim 1, wherein the antenna in the first mode is configured to have a maximum current at a section of the antenna that is parallel to an ear-to-ear axis of a user when the hearing device is worn in its operational position at an ear of the user.

14. The hearing device according to claim 1, wherein the antenna has a first end, the first end being connected to a feed at a first side of the hearing device, and wherein the antenna has a second end, the second end being connected to a ground potential at a second side of the hearing device, the second side being opposite from the first side.

15. A hearing device comprising:

a processing unit configured to determine a hearing device mode of operation, the determined hearing device mode being a first mode or a second mode;

a first wireless communication unit and a second wireless communication unit;

an antenna;

an active matching device configured to couple the first and the second wireless communication units with the antenna;

wherein the active matching device in the first mode is configured to enable the antenna to perform electromagnetic radiation emission and electromagnetic radiation reception at a first frequency, and wherein the active matching device in the second mode is configured to adjust an antenna characteristic of the antenna to enable the antenna to perform electromagnetic radiation emission and electromagnetic radiation reception at a second frequency; and wherein the hearing device has a first side and a second side opposite the first side, wherein the antenna has an electrical length, and wherein a section of the antenna extending from a first location to a second location is approximately half the electrical length, wherein the first location is closer to the first side than to the second side, and wherein the second location is closer to the second side than to the first side.

16. The hearing device according to claim 1, wherein the antenna is configured to resonate at the first frequency.

17. A method performed by a hearing device, the hearing device comprising a processing unit, a first wireless communication unit, a second wireless communication unit, an antenna for electromagnetic radiation emission and electromagnetic radiation reception, the antenna configured to resonate at a first frequency, and an active matching device, the method comprising:

determining, by the processing unit, a hearing device mode of operation, the determined hearing device mode being a first mode or a second mode;

wherein, in the first mode, the method further comprises:

coupling the first wireless communication unit with the antenna via the active matching device; and enabling the antenna to perform electromagnetic radiation emission and electromagnetic radiation reception at the first frequency; and wherein, in the second mode, the method further comprises:

coupling the second wireless communication unit with the antenna via the active matching device; and adjusting an antenna characteristic of the antenna to enable the antenna to perform electromagnetic radiation emission and electromagnetic radiation reception at the second frequency;

wherein the act of enabling and the act of adjusting are performed by an antenna matching device comprising a first matching circuit associated with the first wireless communication unit, and a second matching circuit associated with the second wireless communication unit.

* * * * *